United States Patent Office 3,507,883
Patented Apr. 21, 1970

3,507,883
6-SUBSTITUTED B-NOR-TESTOSTERONE
DERIVATIVES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Original application Aug. 13, 1964, Ser. No. 389,468, now Patent No. 3,356,716, dated Dec. 5, 1967. Divided and this application Nov. 13, 1967, Ser. No. 682,514
Int. Cl. C07d 1/00, 1/02
U.S. Cl. 260—348                                    4 Claims

ABSTRACT OF THE DISCLOSURE

Novel B-norsteroid intermediates are disclosed whose structures are characterized by having a 6,6-ethylene group together with a 17,20-epoxy ring. The intermediates are prepared by reacting a 6-methylene-B-norandrost-4-ene-3,17-dione with trimethylsulfoxonium iodide. The end products prepared using the disclosed intermediates have antiandrogenic activity (see U.S. Patent No. 3,334,140).

---

This application is a divisional of our copending application Ser. No. 389,468 filed Aug. 13, 1964, now U.S. Patent No. 3,356,716.

This invention relates to novel new 6-substituted-B-nor-testosterone compounds having pharmacodynamic activity. This invention also relates to intermediates and processes fo rproducing said new compounds. The new compounds of this invention have particularly useful antiandrogenic and central nervous system depressant activity.

The compounds of this invention are illustrated by the following formula:

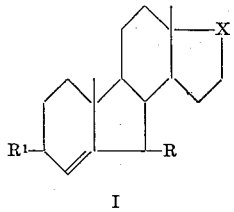

I in which R represents methylene (>C=CH$_2$) or, when taken with the ring carbon atom to which it is attached, spirocyclopropyl $$\left( \begin{array}{c} CH_2 \\ C \\ CH_2 \end{array} \right)$$

R$_1$ represents keto or β-hydroxy; and X represents

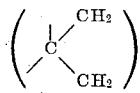

or

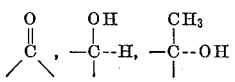

Preferred compounds of this invention are those in which R$_1$ is keto and X represents

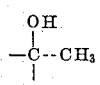

or

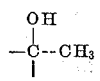

Compounds having particularly advantageous antiandrogenic activity are those in which R is a spiro-cyclopropyl group. The spirocyclopropyl group is perhaps more properly named as a 6,6-ethylene group.

The intermediates and processes of this invention will be apparent from the following description.

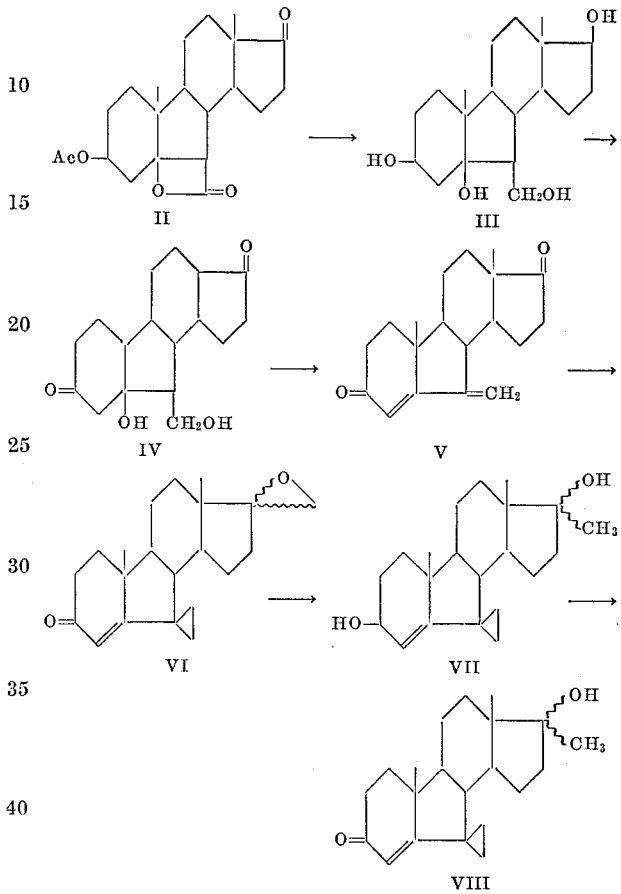

In the above outlined synthesis, the lactone of known 3β - acetoxy - 5β - hydroxy - 17 - oxo - B - norandrostan-6-oic acid (II) is reduced with a bimetallic hydride such as lithium aluminum hydride in a suitable nonpolar organic solvent such as tetrahydrofuran or ether to give 6β - hydroxymethyl - 3β,5β,17β - trihydroxy - B - norandrostane [III, see Takasaki, Chem. Pharm. Bull. 10, 439, (1962)]. This compound is oxidized at positions 3,17 such as by using N-bromoacetamide in alcoholic solvent to 6β - hydroxymethyl - 5β - hydroxy-B-norandrostane-3,17-dione (IV), a new intermediate.

This compound is dehydrated such as by heating in the presence of p-toluenesulfonic acid in an aromatic solvent such as benzene to give the important new intermediate, 6-methylene-B-norandrost-4-ene-3,17-dione (V) which is reacted with an excess of a tri-lower alkyl sulfoxonium halide such as trimethylsulfoxonium iodide in a suitable organic solvent for example dimethyl sulfoxide usually in the presence of a strong alkali such as an alkali metal hydride, i.e., sodium or potassium hydride or an alkali metal lower alkoxide such as sodium methylate or ethylate to give a mixture of isomers, 6,6-ethylene-17,20-epoxy-B-nor-21-norpregn-4-en-3-one (VI).

Either isomer or preferably the isomeric mixture is reduced with a bimetallic hydride such as lithium aluminum hydride in a suitable nonpolar organic solvent such as ethyl ether or tetrahydrofuran to 6,6-ethylene-3β,17β-dihydroxy - 17α - methyl - B - norandrost - 4 - ene (VII). The reduction gives a mixture of isomers at position 3 with the beta isomer predominating. This mixture is then oxidized at position 3 by standard oxidation agents such as 2,3-dichloro-5,6-dicyanobenzoquinone (DDQ) in dioxane to give the desired 6,6-ethylene-17α-methyl-B-nortestosterone or its 17β-isomer (VIII). The isomeric mixtures are separated by fractional crystallization or preferably by chromatography over alumina. These compounds, especially the 17α-methyltestosterone isomer, have potent antiandrogenic activity.

The substituted testosterone congener is prepared similarly but using only about one mole equivalent of the trimethylsulfoxonium iodide reagent for the reaction with 6 - methylene - B - norandrost - 4 - ene - 3,17 - dione under reaction conditions described above at the preferred 6-methylene group. Subsequent reduction and DDQ oxidation as described gives the antiandrogenic 6,6-ethylene-B-nortestosterone.

The 6-methylene congeners of this invention are prepared from 6 - methylene - B - norandrost - 4 - ene - 3,17-dione as well. For example, this intermediate is reacted with lithium aluminum hydride to form 6-methylene-3β,17β - dihydroxy - B - norandrost - 4 - ene which is then oxidized preferentially at position 3 with DDQ as described to form 6-methylene-B-nortestosterone.

The compounds of this invention may be used as such or as O-acylate derivatives which are prepared as known to the art. Such acylate derivatives are those derived from carboxylic acids of a maximum of 10 carbon atoms such as propionate, capryllate, benzoate, enanthate, phenyl acetate or the preferred acetate. Such derivatives are prepared by reaction with an acid halide or anhydride in the presence of a tertiary organic base such as pyridine at room temperature or slightly elevated temperature. The 17-methyl congeners form with more difficulty, as known to the art, such as by using an excess of acetic anhydride at reflux for several hours. Also equivalent to the end compounds of this invention of Formula I in which X is

are the cycloalkene ethers of said compounds such as those in which X is

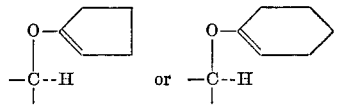

Such derivatives are prepared by reacting the parent 6-substituted testosterone with a cyclopentenone or cyclohexenone dimethyl ketal in the presence of a trace of acid usually p-toluenesulfonic acid at about 100–200° C.

Other variations of this invention will be apparent to those skilled in the art but the nub of this invention is the B-nortestosterone skeleton having a 6,6-ethylene or methylene substituent. The term "alkali metal" is used as known to the art but preferably means sodium or potassium. The term "lower alkyl" is used to define groups having a maximum of 6 carbon atoms preferably ethyl or methyl.

The following examples will illustrate this invention further to those skilled in the art but are not designed to limit this invention.

EXAMPLE 1

To a stirred suspension of 20 g. of lithium aluminum hydride in 700 ml. of tetrahydrofuran under a nitrogen atmosphere is slowly added 30 g. of 3β-acetoxy-5β-hydroxy - 17 - oxo - B - norandrostan - 6 - oic acid 5,6 - lactone [Tanabe et al., Chem. Pharm. Bull., 9, 12 (1961)] in 250 ml. of tetrahydrofuran. After addition is complete, the reaction mixture is stirred at reflux for 2 hours. After cooling with an ice bath the reaction mixture is slowly treated with 80 ml. of water in 100 ml. of tetrahydrofuran. The resulting white precipitate is removed by filtration and washed with fresh tetrahydrofuran. Evaporation of the filtrate gives a residue of 6β-hydroxy-methyl-3β,5β,17β-trihydroxy-B-norandrostane, M.P. 166–170° C. after crystallization from ethyl acetate.

EXAMPLE 2

To a stirred solution of 60 g. of N-bromoacetamide in 1 l. of methanol, protected from direct light, is added 18 ml. of pyridine, 60 ml. of water and 18 g. of 6β-hydroxymethyl - 3β,5β,17β - trihydroxy - B - norandrostane. After stirring at room temperature for 16 hours 40 g. of solid sodium sulfite followed by 400 ml. of water is added, stirring is continued for a few minutes, and finally the reaction mixture is concentrated to 500 ml. at reduced pressure. The warm mixture is diluted with 1.5 l. of water, cooled, and filtered to give crystalline 6β-hydroxymethyl-5β - hydroxy - B - norandrostane - 3,17 - dione, M.P. 178–180° C. after recrystallization from ethyl acetate.

EXAMPLE 3

A solution of 5 g. of 6β-hydroxymethyl-5β-hydroxy-B-norandrostane-3,17-dione in 500 ml. of benzene containing 0.5 g. of p-toluenesulfonic acid is stirred at room temperature under nitrogen for 10 hours. The reaction mixture is washed with dilute aqueous sodium carbonate solution, dried, and evaporated to a residue of 6-methylene-B - norandrost - 4 - ene - 3,17 - dione which after recrystallization from methanol has M.P. 143–148° C., U.V.: $\lambda_{max.}$ 283 mμ (ε 15,500).

EXAMPLE 4

To a stirred solution of 9.3 g. of trimethylsulfoxonium iodide in 90 ml. of dimethyl sulfoxide under a nitrogen atmosphere is slowly added 1.6 g. of sodium hydride as a 55% mineral oil suspension. After stirring for 10 minutes 10 g. of 6 - methylene - B - norandrost - 4 - ene - 3,17-dione in 150 ml. of dimethyl sulfoxide is added. The reaction mixture is stirred for 30 minutes at room temperature and then at 60° C. for 45 minutes. It is then poured into water and extracted with benzene. Evaporation of the dried benzene extracts gives a residue of 6,6-ethylene-B - norandrost - 4 - ene - 3,17 - dione, M.P. 205–209° C., U.V.: $\lambda_{max.}$ 262 mμ (ε 15,900) after recrystallization from acetone-hexane.

EXAMPLE 5

To a stirred suspension of 1.7 g. of lithium aluminum hydride in 85 ml. of ether under a nitrogen atmosphere is slowly added 6.8 g. of 6,6-ethylene-B-norandrost-4-ene-3,17-dione in 110 ml. of tetrahydrofuran. After addition is complete the reaction mixture is refluxed for 2 hours, cooled, treated with 7 ml. of water in 20 ml. of tetrahydrofuran, filtered and the filtrate evaporated to a crude residue of 6,6-ethylene-3β,17β-dihydroxy-B-norandrost-4-ene. This residue contains a portion of the 3α-hydroxy isomer which is also a part of this invention. Without further purification the crude diol is dissolved in 100 ml. of dioxane and treated with 5.7 g. of 2,3-dichloro-5,6-dicyanozenzoquinone (DDQ) in 70 ml. of dioxane. After 5 hours at room temperature the reaction mixture is filtered and the filtrate is evaporated to a residue which is dissolved in methylene chloride-benzene (1:1) and chromatographed on 200 g. of alumina (activity III Woelm). Elution with methylene chloride-benzene (1:1) and methylene chloride gives 6,6-ethylene-B-nortestosterone, M.P. 175–177° C. after recrystallization from ethyl acetate.

This compound (500 mg.) is reacted with an excess of propionyl chloride in pyridine. Quenching and washing gives the propionate ester.

A mixture of 10 ml. of distilled cyclopentenone dimethyl ketal and 4.5 g. of 6,6-ethylene-B-nortestosterone with a trace of p-toluenesulfonic acid is placed in a flask with a water trap. The mixture is heated at 150–175° C. bath temperature until collection of distillate is complete. The residue is cooled, diluted with aqueous methanol containing a few drops of pyridine and chilled to give the desired 6,6-ethylene - B - nortestosterone 17-cyclopentenyl ether. The 17-cyclohexenyl ether is similarly prepared.

EXAMPLE 6

To a stirred solution of an excess (27 g.) of trimethyl-sulfoxonium iodide in 270 ml. of dimethyl sulfoxide under a nitrogen atmosphere is added, in portions, 5.3 g. of sodium hydride as a 55% mineral oil suspension. After stirring for 10 minutes 10 g. of 6-methylene-B-norandrost-4-ene-3,17-dione in 150 ml. of dimethyl sulfoxide is added. The reaction mixture is stirred for 30 minutes at room temperature, 45 minutes at 60° C., and then allowed to stand at room temperature for 3 days. It is then poured into water and extracted with benzene. Evaporation of the dried benzene extracts gives a crude residue of a mixture of 6,6-ethylene-17β,20-epoxy-B-nor-21-nor-17-isopregn-4-en-3-one and 6,6 - ethylene-17α,20-epoxy-B-nor-21-nor-pregn-4-en-3-one in a ratio of about 2:1. After purification by chromatography over alumina (activity III Woelm) and crystallization from acetone-hexane the mixture melts at 131–161° C.

EXAMPLE 7

To a stirred suspension of 1.1 g. of lithium aluminum hydride in 50 ml. of ether under a nitrogen atmosphere is slowly added 70 ml. of tetrahydrofuran containing 4.7 g. of a mixture of 6,6-ethylene-17β,20-epoxy-B-nor-21-nor-17-isopren-4-en-3-one and 6,6-ethylene-17α,20-epoxy-B-nor-21-norpregn-4-en-3-one. Following the addition the reaction mixture is refluxed for 2 hours, cooled, treated slowly with 4.5 ml. of water, filtered and the filtrate evaporated to a residue. The residue, which contains 6,6-ethylene-3β,17β-dihydroxy-17α-methyl-B-norandrost-4-ene and 6,6 - ethylene-3β,17α-dihydroxy-17β-methyl-B-norandrost-4-ene is dissolved in 100 ml. of dioxane and treated with 3.7 g. of 2,3-dichloro-5,6-dicyanobenzoquinone (DDQ). After stirring at room temperature for 16 hours the reaction mixture is filtered and the filtrate is evaporated to a residue. The residue is dissolved in benzene and chromatographed on 180 g. of alumina (Woelm activity III). Elution with benzene and benzene-methylene chloride mixture gives 6,6-ethylene-17α-methyl-B-nortestosterone, M.P. 189–191° C., U.V. $\lambda_{max.}$ 263 m$\mu$ ($\epsilon$16,000) after recrystallization from acetone-hexane. Elution with methylene-chloride gives 6,6-ethylene-17α-hydroxy-17β-methyl-B-nor-androst-4-en-3-one, M.P. 191–194° C., U.V.: $\lambda_{max.}$ 264 m$\mu$ ($\epsilon$16,000) after recrystallization from ether.

The former isomer (500 mg.) is heated at reflux in an excess of acetic anhydride for 6 hours. Quenching in water gives the O-acetate derivative.

What is claimed is:

1. The method of preparing a compound having the formula:

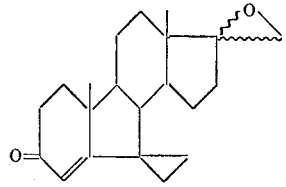

comprising reacting 6-methylene-B-norandrost-4-ene-3,17-dione with an excess of trimethylsulfoxonium iodide in the presence of an alkali metal hydride.

2. The method of claim 1 in which sodium hydride is used.

3. A compound having the formula:

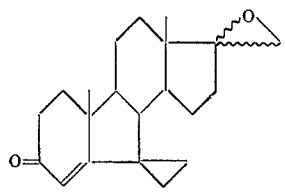

4. The compound of claim 3 in which the 17-oxy link is β, said compound being 6,6-ethylene-17β,20-epoxy-B-nor-21-nor-17-isopregn-4-en-3-one.

References Cited

UNITED STATES PATENTS 3,300,489   1/1967   Holden _____ 260—239.57

NORMA S. MILESTONE, Primary Examiner

U.S. Cl. X.R.

260—343.2, 586, 617, 999